Patented Sept. 3, 1929.

1,726,650

UNITED STATES PATENT OFFICE.

OSCAR A. CHERRY AND FRANZ KURATH, OF CHICAGO, ILLINOIS, ASSIGNORS TO ECONOMY FUSE AND MANUFACTURING COMPANY, OF CHICAGO, ILLINOIS, A CORPORATION OF NEW YORK.

METHOD OF PRODUCING PHENOLIC CONDENSATION PRODUCTS.

No Drawing.   Application filed April 21, 1926.   Serial No. 103,619.

The present invention relates to methods of producing phenolic condensation products.

The application for United States Letters Patent filed on or about February 19, 1926, by Franz Kurath, which application bears Serial No. 89,438, describes a process whereby potentially reactive phenolic condensation products may be produced economically by a one-step reaction. Said process is characterized especially by the fact that the danger of obtaining rubbery, infusible and useless products is eliminated. The potentially reactive products obtained by said process are suitable for use in the ways in which potentially reactive resins are ordinarily used. and are especially adapted for mixing with fillers and molding under heat and pressure. Said process contemplates the use of furfuramide, which furfuramide is applied to a reaction product of a phenolic body and a methylene containing substance.

An object of the present invention is to provide a method for preparing potentially reactive condensation products which method is even simpler than the Kurath process above referred to and which in commercial operation may result in a reduction of cost.

In one of its aspects the present invention contemplates the use of a phenolic body and formaldehyde or other methylene containing substance in proportions such as will produce an infusible product upon continued heating, such substances being used with furfural and ammonia. As will be understood by those skilled in the art, benzaldehyde may be substituted for furfural. Furfural and benzaldehyde have many characteristics in common, and it is to be understood that when the term "furfural" is used in this specification, including the claims, said term is to be considered of such scope as to also include benzaldehyde and equivalent substances.

According to another aspect of the present invention, hexamethylenetetramine may be substituted for the ammonia among the materials immediately above referred to.

Merely for the purpose of illustration, it may be assumed that a mixture of 200 parts of a phenolic body such as phenol, 200 parts of a methylene containing substance such as a formaldehyde solution, 72 parts of furfural, and 30 parts of concentrated aqueous ammonia are mixed and heated under a reflux condenser until separation into two layers has occurred, said heating being continued until the lower resinous layer has acquired the desired consistency. Usually the heating is stopped at a point such that the resinous portion when cooled is quite thick and does not flow rapidly under its own weight. It will be understood, of course, that the proportions as given above may be varied over wide limits, especially as regards the amounts of furfural and ammonia. For example, the furfural may be reduced to 30 parts or less, the ammonia being reduced correspondingly, or the furfural may be employed in slight excess of that required to combine with the ammonia, without deleterious effects.

Obviously, the process may be varied considerably without departing from the spirit of the invention. For example, a small quantity of furfural and ammonia may be used in the primary stages of the reaction, and additional furfural and ammonia may be added later; or furfuramide may be added in lieu of furfural and ammonia in the later stages of the reaction; or another condensing agent such as oxalic acid may be used in the primary stages; or the initial reaction may be carried out in the absence of the condensing agent.

According to the second mentioned aspect of the present invention as above referred to, in which hexamethylenetetramine may be substituted for ammonia, in this case the amount of formaldehyde or other methylene containing substance to be combined with said hexamethylenetetramine will be reduced. Though the reactions are not fully understood, it is probable that the hexamethylenetetramine combines with the phenolic body, liberating the ammonia. The exact nature of the reaction which occurs by employing furfural and an ammonia liberating substance is not known to the applicants at present, but the result is the retention within the resinous layer of the reactive methylene groups in a non-volatile and reactive form, after the supernatant layer is discarded. Said liberated ammonia combines either with the formaldehyde remaining in the solution, or with the furfural, to produce furfuramide.

The supernatant water may then be decanted without loss of formaldehyde, and a potentially reactive resin is had which contains only a small amount of water. There is no danger of obtaining a rubbery, worthless product in our one-step process, which danger has been present in the one-step process as commonly practiced heretofore. Any small amounts of water still present in the resin may be removed by heating for a short time at temperatures below that at which hardening occurs.

In any case, it is necessary to have sufficient methylene containing substance present to combine with all of the phenolic body, since if there should be a deficiency of methylene containing substance, some of the furfuramide produced would enter into combination with the phenolic body, resulting in a product containing free ammonia, which would, of course, be undesirable.

The word "phenol" as appearing in the specification and claims should be interpreted to include homologues of phenol or mixtures of phenol and its homologues, or mixtures of various homologues of phenol.

What is claimed is—

1. The process which consists in producing a mixture of a reactive methylene containing substance, phenol, furfural and a substance which will liberate ammonia, said reactive methylene containing substance being present in sufficient quantity so that an infusible product would result upon heating, and then heat treating said mixture.

2. The process which consists in producing a mixture of a reactive methylene containing substance, phenol, furfural and a substance which will liberate ammonia, said reactive methylene containing substance being present in sufficient quantity so that an infusible product would result upon heating, heat treating said mixture until separation into two layers occurs and then mechanically discarding the supernatant layer.

3. The process which consists in producing a mixture of a reactive methylene containing substance, phenol, furfural and ammonia, said reactive methylene containing substance being present in sufficient quantity so that an infusible product would result upon heating, and then heat treating said mixture.

4. The process which consists in producing a mixture of a reactive methylene containing substance, phenol, furfural and ammonia, said reactive methylene containing substance being present in sufficient quantity so that an infusible product would result upon heating, heat treating said mixture until separation into two layers occurs and then mechanically discarding the supernatant layer.

5. The process which consists in producing a mixture of formaldehyde, phenol, furfural and a substance which will liberate ammonia, said formaldehyde being present in sufficient quantity so that an infusible product would result upon heating, and then heat treating said mixture.

6. The process which consists in producing a mixture of formaldehyde, phenol, furfural and a substance which will liberate ammonia, said formaldehyde being present in sufficient quantity so that an infusible product would result upon heating, heat treating said mixture until separation into two layers occurs and then mechanically discarding the supernatant layer.

7. In a one-step reaction of the character described, employing methylene groups as a hardening agent, the process which consists in producing the initial condensation product and supernatant layer, removing the reactive methylene groups from said supernatant layer and fixing said reactive methylene groups in the resinous layer in a substantially non-volatile reactive form and then mechanically discarding the supernatant layer.

8. In a one step reaction of the character described, employing methylene groups as a hardening agent, the process which consists in producing the initial condensation product and supernatant layer, carrying the reactive methylene groups from the supernatant layer into the resinous layer in a substantially non-volatile reactive form by the action of furfural and a substance which will liberate ammonia and then mechanically discarding the supernatant layer.

9. The method of retaining the reactive methylene groups in the one step condensation reaction described, which consists in causing furfural and a substance which will liberate ammonia to be present after the supernatant layer is formed by the initial reaction.

10. In one step process for producing a condensation product from phenol and a methylene containing substance, the method of fixing the reactive methylene groups in the resinous layer in a substantially non-volatile reactive form by the action of furfural and a substance which will liberate ammonia.

Signed at Chicago, Illinois, this 9th day of April, 1926.

OSCAR A. CHERRY.
FRANZ KURATH.